United States Patent [19]

Yanagi et al.

[11] Patent Number: 5,280,475
[45] Date of Patent: Jan. 18, 1994

[54] TRAFFIC SHAPING METHOD AND CIRCUIT

[75] Inventors: Junichirou Yanagi, Kodaira; Akihiko Takase, Tokyo; Takahiko Kozaki, Koganei; Shinobu Gohara, Yokohama, all of Japan

[73] Assignee: Hitachi, Ltd., Tokyo, Japan

[21] Appl. No.: 745,466

[22] Filed: Aug. 14, 1991

[30] Foreign Application Priority Data

Aug. 17, 1990 [JP] Japan .................................. 2-215705

[51] Int. Cl.$^5$ .......................................... H04L 12/56
[52] U.S. Cl. .................................................. 370/60
[58] Field of Search ............. 370/94.1, 60, 84, 85, 370/15, 85.1, 85.6; 340/825.50, 825.51, 825.52

[56] References Cited

U.S. PATENT DOCUMENTS

| | | | |
|---|---|---|---|
| 4,864,560 | 9/1989 | Quinquis et al. | 370/94.1 |
| 4,875,206 | 10/1989 | Nichols et al. | 370/85.15 |
| 4,933,846 | 6/1990 | Humphrey et al. | 370/85.1 |
| 4,943,024 | 2/1991 | Quinquis et al. | 370/84 |
| 5,127,002 | 6/1992 | Shaik et al. | 370/94.1 |
| 5,128,929 | 7/1992 | Kobayashi | 370/94.1 |

FOREIGN PATENT DOCUMENTS 0299473  1/1989  European Pat. Off. .

OTHER PUBLICATIONS

Arrangement Method of Shared Buffer Type ATM Switching LSI, by Kosaki et al., Technical Report of the Institute of Electronics and Communication Engineers of Japan, pp. 49-54, Feb. 1990.
Line Setting Method of ATM Switching Network, by Shigesada et al., Technical Report of the Institute of Electronics and Communications Engineers of Japan, pp. 31-36, Jan. 1990.
A Shared Buffer Memory Switch for an ATM Exchange, Kukahara et al., pp. (4.4.1)-(4.4.5), Sep. 1989.
Switching and Fair Control of Congested Flow in Broadband Networks, Katevenis, pp. 1315-1326, Oct. 1987.
International Switching Symposium 1990 "Innovations in Switching Technology", vol. 5, Jun. 1990, Konuma et al. pp. 21-26.

Primary Examiner—Wellington Chin
Assistant Examiner—Dang Ton
Attorney, Agent, or Firm—Antonelli, Terry Stout & Kraus

[57] ABSTRACT

A traffic shaping method and circuit of a packet switching system in which input packets having a fixed length and multiplexed on a plurality of inputs are multiplexed to be delivered on any output of a plurality of outputs, connects the input packet to a list structure using an address chain formed for each output, forms the list structure even for each line identifier provided in the packet, and assigns the identifier for each time slot of the output to take out the packet from the list structure, to thereby prevent the packet having the same identifier from being multiplexed and delivering to the output continuously.

16 Claims, 5 Drawing Sheets

TRAFFIC SHAPING METHOD AND CIRCUIT

BACKGROUND OF THE INVENTION

The present invention relates to a traffic shaping method and system for a virtual path or a virtual connection in a packet switch of a cross connector or a switch for a fixed-length packet, and more particularly to a re-arrangement control method and system for a burst packet arriving from a subscriber line. Specifically, it is suitable for a cell switch in an apparatus using an ATM (Asynchronous Transfer Mode) system.

In the ATM system which complies with the international standard of the CCITT (International Telegraph and Telephone Concultative Committee) in regard to a broadband and multimedia communication in a communication field, a fixed-length packet named a cell is used to effect transmission and switching. Many switch systems for switching the cells have been proposed.

Further, in a transmission apparatus for connecting between switching systems, a virtual line named a virtual path is used as a unit to modify the architecture of the network flexibly and simplify the administration of the line. In this case, it is able to establish a plurality of virtual channels in each virtual path to realize plural pairs of inter-terminal communications on the same path by providing each cell with a virtual path identifier and a virtual channel identifier to discriminate its connection. An apparatus for switching the cell in accordance with the virtual path is employed and this apparatus is named an ATM cross connector. This cross connector is considered to be a kind of ATM switch.

Figure 2:
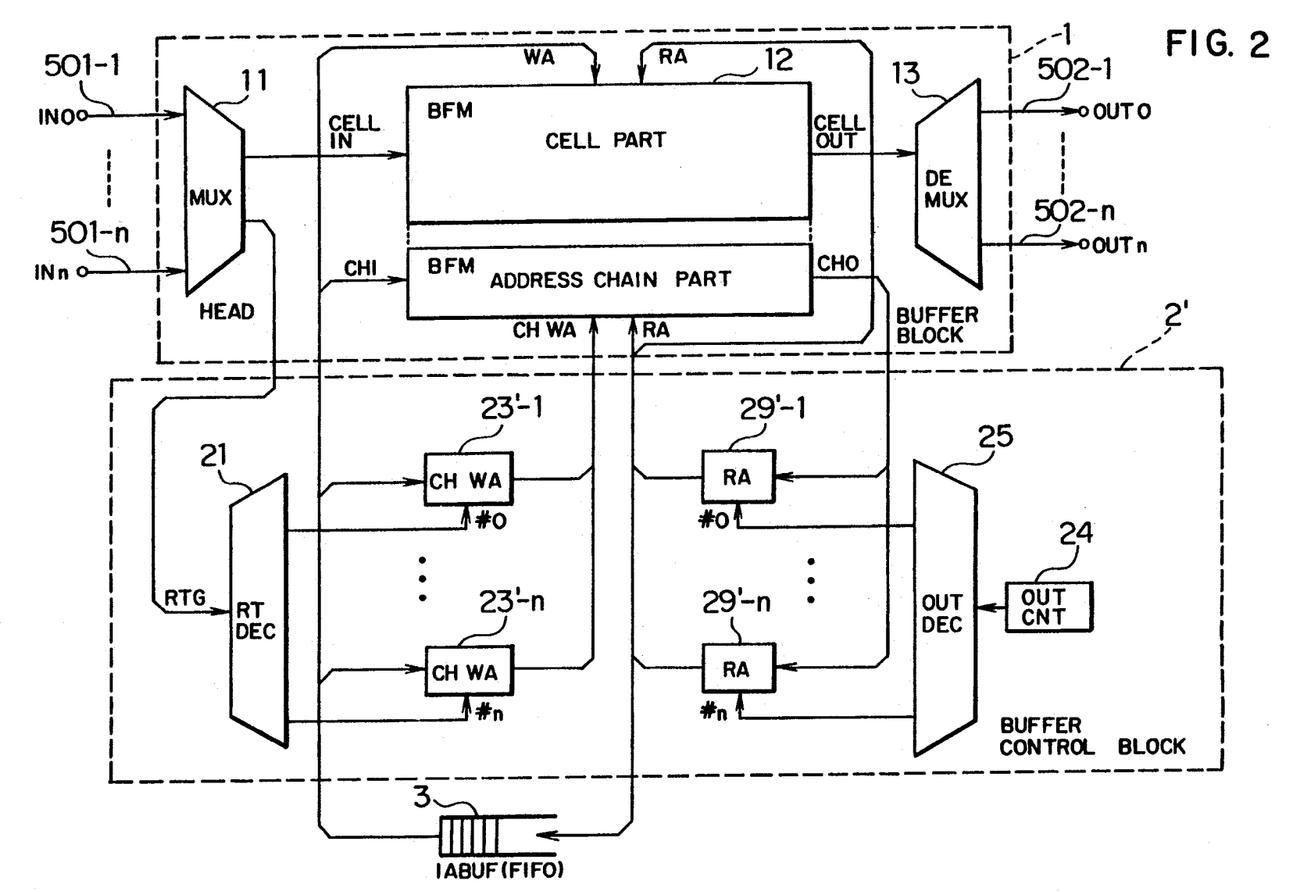
FIG. 2 is a block diagram showing an example of an arrangement of a conventional shared buffer switch.

One of the ATM switch system is a shared buffer memory switch. An example of its arrangement method is described in an article "LSI IMPLEMENTATION FOR SHARED BUFFER TYPE ATM SWITCH" by Kosaki et al., Technical Report of the Institute of Electronics, Information and Communication Engineers of Japan, SSE89-144, pp. 49-54 (February, 1990) and is shown in FIG. 2.

Generally, various terminal equipments connected to a subscriber line produce a so-called burst traffic having a period in which data is continuously produced and a period in which no data is produced. When an ATM switching system accommodates such a burst traffic, an amount of buffers required in the ATM switching system is known to require ten and several times to several tens times as large as that in the case where the traffic in which the cell occur at random is accommodated. Accordingly, in order to arrange the ATM network economically by using the cross connector having less amount of buffers, it is necessary to eliminate the burst traffic in the apparatus which accommodates the subscriber lines. To this end, it is necessary to arrange the cells belonging to the same virtual channel or virtual path extremely uniformly in time. This procedure is named the traffic shaping.

A method of effecting such a traffic shaping is described by way of example in an article "PATH HANDLING IN ATM NETWORKS" by Shigesada et al., Technical Report of the Institute of Electronics, Information and Communication Engineers of Japan SSE89-120 pp. 31-36 (January, 1990). More particularly, a system is described in which the traffic shaping is effected by previously determining a time position of the cell belonging to the virtual path or the virtual channel within a frame in an output of the switching system or the cross connector. Further, an algorithm for defining the time position for each output dynamically is also described.

In the switch arrangement by a shared buffer memory switch using the above conventional technique, the traffic shaping is not considered. Accordingly, the line having the burst traffic is switched and delivered while preserving the burst characteristic. As a result, there is a problem that a large amount of buffer memories are required in the cross connector or the switch connected to the output.

Further, even if the traffic shaping for each output is made by the above conventional technique, it is necessary to change the order of time in order to effect the traffic shaping. In this case, since a waiting buffer is required, there is a problem that a great number of buffers are required for a traffic shaping apparatus. On the other hand, by using the algorithm shown in the above conventional technique for dynamically defining the time position, reduction of the memory capacity is also shown. However, since an apparatus for executing this algorithm is complicated and it is necessary to lengthen the period of determining the arrangement to effect more uniform arrangement, there is a problem that the memory capacity is increased.

Further, when the memory capacity is increased, there is a problem that the time that the cell stays in the memory is made long and the delay in the transmission and switching is increased.

SUMMARY OF THE INVENTION

It is an object of the present invention to reduce a memory capacity necessary for the traffic shaping.

It is another object of the present invention to realize the traffic shaping without increased amount of buffers of an apparatus by using a large amount of buffers included originally in a switch as a memory necessary for the traffic shaping.

Further, it is a further object of the present invention to provide a method and system capable of realizing the traffic shaping effectively with a simple arrangement.

In addition, it is a still further object of the present invention to reduce an amount of buffers required when demultiplexing to a line having a lower transmission rate by utilizing the traffic shaping.

It is still another object of the present invention to provide a traffic shaping method and system capable of changing bandwidth easily.

A shared buffer type memory switch is provided with a large capacity of buffer memory for storing a plurality of fixed length packets (cells), and a pointer address memory for storing pointer addresses to designate a memory location of a next associate cell for each of the stored cells so as to form address chains in the buffer memory. That is, a list structure using an address chain for each output is prepared in the buffer in combination with the address pointer memory.

When a cell is inputted, the cell is first stored in the buffer memory at a memory location which is designated by an address taken out from idle write address buffer. At the same time, an output line of the cell is judged on the basis of routing information included in a header portion of the cell and the write address of the cell is stored in the pointer address memory at a memory location corresponding to the last cell which is to be delivered to the same output line so that a chain of addresses of the list structure for the corresponding output line is extended.

Further, in a term of read out operation of cell, one of the list structures is selected in accordance with the output line periodically and a cell to be delivered to the output line is taken out of the top of the list structure corresponding to the output line, then a pointer address stored in the pointer address memory is read out from a memory location corresponding to the output cell. This pointer address is temporarily stored until next read cycle in a table memory means in corresponding to the output line as a read address to be used in the next read operation as to the same list structure.

When the above operation is performed for all of the inputs and outputs periodically, the inputted cells are classified in the list structures in accordance with the output lines to be delivered and are read out to the corresponding output lines. That is, the switching operation can be attained. Further, the input cells to be delivered to the same output line are connected to the same list structure in the order of arrival and accordingly the order of output time form the buffer memory is not replaced as to the same output line.

In the present invention, in order to achieve the above objects, the input cell are not only classified by output lines but also classified by the virtual path or the virtual channel for each output line and connected to one of a plurality of list structures corresponding to the virtual path or the virtual channel for each output line to be delivered. Further, when the cell is read out, the virtual path or the virtual channel is designated at each time slot for each output line and the cell is read out from the top of the corresponding list structure specified by the designated virtual path or the virtual channel.

Further, in the present invention, in order to achieve the other objects, the following circuit configuration is adopted. That is, in order to store the input cell into one of the list structure prepared for each virtual path or virtual channel, there is provided a write control table means for producing an identifier to assign the list structure for connecting the cell, a write address to designate the memory location for storing the cell or an address of a chain to be connected, when an identifier of the virtual path or the virtual channel is given. Further, in order to take out the cell from one of the list structures specified by the virtual path or the virtual channel, there is provided a read control table means for producing an identifier to assign the list structure, an address to designate the memory location for reading the cell therefrom or an address of a chain to be taken out, when the identifier of the virtual path or the virtual channel is given. Furthermore, in order to assign the virtual path or the virtual channel in accordance with the reading timing for each output, there are provided a counter means having a fixed period and a control table means for controlling the bandwidth assignment of each list structure. This control table means stores a plurality of identifiers of the virtual path or the virtual channel and is periodically referred by a value of the counter means in order to supply said write control table with one of the identifiers of the virtual path or the virtual channel at the respective timing.

In the shared buffer type memory switch according to the present invention, the classification is made in accordance with not only the output line but also the virtual path or the virtual channel to which the cell belongs to prepare the list structure. Accordingly, the virtual path or the virtual channel can be assigned to deliver the cell while maintaining the order of the cell belonging to the same virtual path or the virtual channel. Thus, by assigning so that the virtual path or the virtual channel is arranged as uniformly as possible, the cell arriving in the burst manner can be arranged uniformly and delivered.

Further, in the traffic shaping circuit using the shared buffer type memory switch according to the present invention, the list structure for each virtual path or virtual channel is prepared in the buffer within the switch. Accordingly, the buffer for replacing the order of the cell which is required for the traffic shaping for each output can be used commonly. That is, the increase amount of buffer can be removed.

Generally, the switch which performs the switching operation with a single shared buffer has a greatly reduced memory capacity as compared with the switch having a buffer for each output line. This is because even reduced total amount of buffers is satisfactory in the shared buffer type switch since the buffers are assigned dynamically as occasion demands even if an output requiring many buffers exists. This is named the reduction effect of the buffers by sharing, that is, the sharing effect. The total amount of buffers in the traffic shaping of the present invention in which the switch has the buffers and block is reduced by the sharing effect as compared with the case where the traffic shaping is made for each output. Further, in the present invention, since the switch and the traffic shaping function share the buffer, the amount of buffers for the whole apparatus can be reduced by the sharing effect.

Furthermore, in the present invention, there are provided a table and a counter for assigning the virtual path or the virtual channel to be delivered, and assignment of the arrangement of the cell, that is, assignment and control of the bandwidth is made in accordance with the contents of the table. Accordingly, if the contents of the table can be determined to be optimum previously, the traffic shaping can be made effectively. Further, the number of cells staying in the buffer is also reduced and the delay is reduced. Generally, this is because the cell can be arranged uniformly by determining the arrangement of the cell statically as compared with the case where the arrangement of the cell is dynamically determined.

In the present invention, since the assignment of the bandwidth is made by using the table, the band is changed extremely flexibly.

In the shared buffer switch of the present invention, in addition to the classification in the virtual path or the virtual channel and the connection to the list structure, the classification can be made by the line number in the case of demultiplexing to a line having a low speed so that the list structure can be made. Further, in addition of the virtual path or the virtual channel, if the line number having a low speed is also assigned, the cell can be delivered so that the line number is periodic. Accordingly, the cell can be distributed to the low speed line periodically by a demultiplexer to thereby minimize the buffers in the demultiplexer.

DESCRIPTION OF THE PREFERRED EMBODIMENTS

An embodiment of the present invention is now described with reference to FIGS. 1 and 3.

Figure 1:
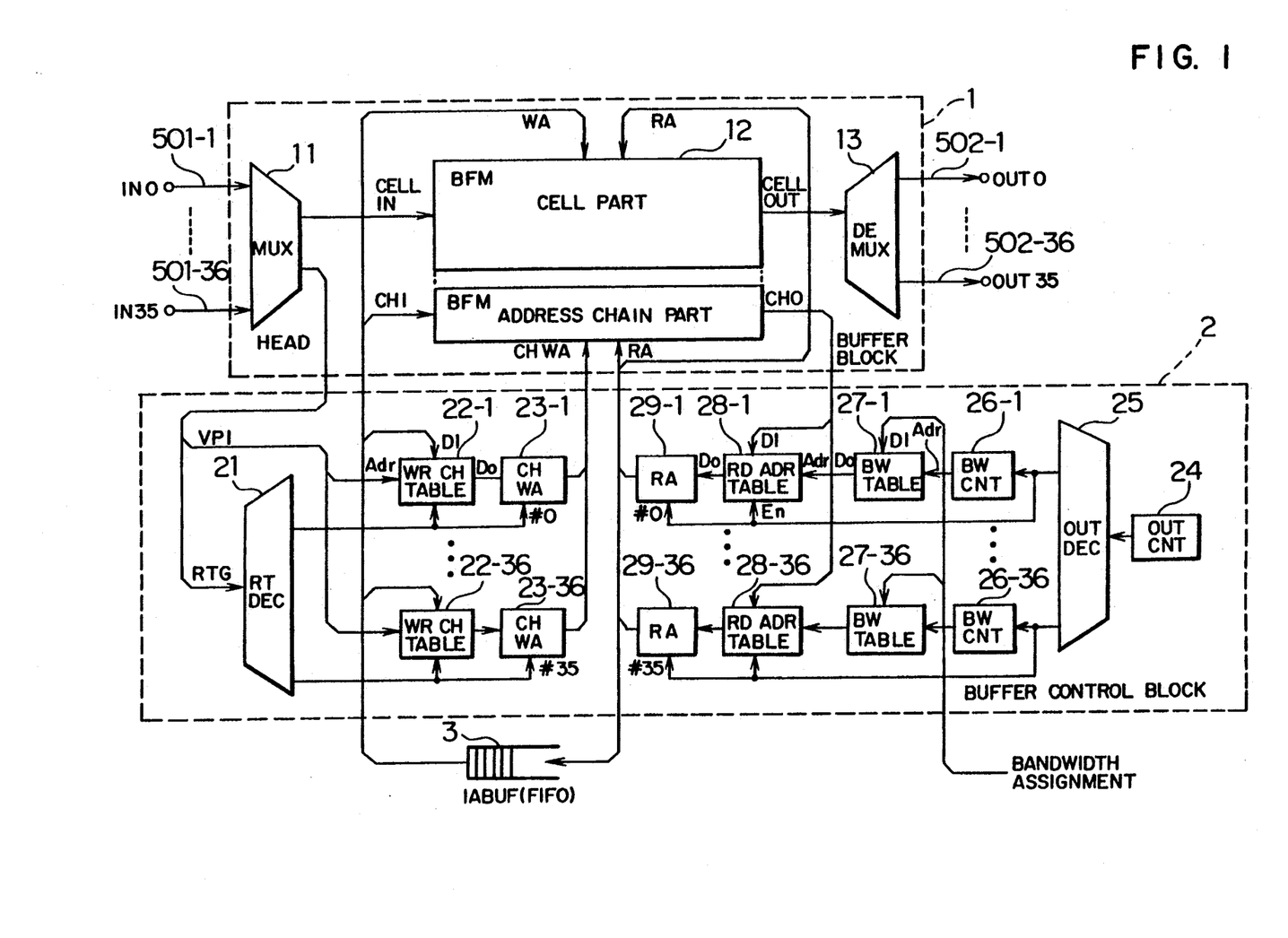
FIG. 1 is a block diagram of an embodiment of a packet switching system according to the present invention.

FIG. 1 is a block diagram of an embodiment of a shared buffer switch for performing the traffic shaping according to the present invention. For the purpose of description, it is assumed that the shared buffer switch is arranged with 36×36 switches. This is because the ratio of the number of input lines (IN0~IN35) 501-1~501-35 and output lines (OUT0~OUT35) 502-1~502-35 and the length of the cell is set to a simple integral ratio which is 2:3 (=36:54) so that the logic configuration for the multiplex/demultiplex in the writing of the cell in the buffer is simplified. Further, the traffic shaping is made for each virtual path. The virtual path can be recognized by a virtual path identifier (VPI).

The switch comprises a buffer block 1 and a buffer control block 2.

The cells arriving through inputs 501-1 to 501-36 are multiplexed in an MUX 11 and stored one by one in a buffer memory (BFM) 12 which comprises a first memory region (CELL PART) for storing cells and a second memory region (ADDRESS CHAIN PART) for storing pointer addresses. At this time, the cell is stored in a memory location addressed by an idle address WA taken out from an idle address buffer (IA BUF) 3. Each of input cells includes an identifier (VPI) of virtual path and an identifier (VCI) of virtual channel, and a routing tag (RTG) indicative of an output line of each of the cells. The routing tag (RTG) is extracted by the multiplexer (MUX) 11 and supplied from the buffer block 1 to the buffer control block 2. The RTG is decoded by a routing decoder (RT DEC) 21 to enable one of write chain address tables (WR CH Table) 22-1 to 22-36 corresponding to the output line to which the arrival is delivered. The WR CH Tables 22-1 to 22-36 store write addresses (WA) used to store the cells last time for each VPI. Accordingly, if referring to one of the WR CH Tables 22-1 to 22-36 with the VPI of the arrival cell, the write address (WA') used to store a preceeding cell of the same VPI last time is identified. Therefore, by chaining an write address (WA) used to write the cell this time with a memory location of the buffer memory designated by that address (WA'), the list structure can be formed. Chain write address registers (CH WA) 23-1 to 23-36 are used to hold temporarily address values read from the WA CH Table 22-1 to 22-36, respectively. When the input cell is stored in the buffer memory (CELL PART), the contents of one of the WR CH Tables 22-1 ≃22-36 enabled by the output of the RT DEC 21 is updated by the write address (WA) used to write the cell arriving this time, that is, the address taken out of the IA BUF 3 for the subsequent writing.

The reading of the cell from the buffer memory is made as follows. First of all, an output line counter (OUT CNT) 24 generates a count value to assign an output line to which a cell is to be delivered next. The output of the OUT CNT 24 is supplied to an output line decoder (OUT DEC) 25 to select one of bandwidth counters (BW CNT) 26-1 to 26-36 provided for each output. The BW CNT's 26-1 to 26-36 are used to specify an output VPI for each time slot and selected one of these BW CNT's generates a count value for addressing a memory location of a bandwidth table (BW Table) 27-1 connected thereto. Each of the bandwidth table (BW Table) 27-1 to 27-36 has a plurality of memory location for storing VPI's and selected one of them which is referred by the output value of the BW CNT's 26-i is read out as a VPI for which read option of cell is executed this time. Then, this VPI is employed to refer to one of read address tables (RD ADR Table) 28-1 to 28-36. Each of these RD ADR Tables 28-1 to 28-36 has a plurality of memory locations addressable by the value of VPI outputted from the BW Table connected therewith to hold in each memory location an read address (RA) of the buffer memory 12. The output cell is read out from the buffer memory (BFM) 12 by this address to demultiplex the cell by a DEMUX 13 to deliver it. At the same time, the chain is read from the BFM 12 to update the RD ADR Tables 28-1 to 28-36. Thus, the address in the BFM 12 can be obtained in the subsequent reading. Further, the address used to read the cell in the BFM 12 is idle and accordingly this idle address is stored in the idle address buffer (IA BUF) 3. Read address registers (RA) 29-1 to 29-36 are to hold temporarily a value read from the RD ADR Tables 28-1 to 28-36.

As described above, the shared buffer switch is configured. The traffic shaping is made by this switch as follows. That is, the VPI's corresponding to the time slot are stored for each of outputs 502-1 to 502-36 in the bandwidth tables (BW Table) 27-1 to 27-36. For example, when the total amount of the bandwidth of each output line 502-1 to 502-36 is 150 mB/sec and it is desired to set a virtual path having the bandwidth of 50 Mb/sec on the output line 502-i, the value of a VPI corresponding to the desired virtual path is set at plural address locations in the BW Table 27-i at a ratio of three addresses to one address. Read addressees RA's to access the list structure which stores the input cell shaving the VPI mentioned above are generated in accordance with the frequency of the VPI in the BW table. Therefore, the number of output cells having the VPI mentioned above are only at the ratio of maximum one cell to three cells among the total output cell son the output line 502-i. Further, by setting these same VPI's so as to be equal interval in the BW Table 27-i, it is able to control so that the input cells are not delivered to the output line 502-i with a shorter interval than the set interval. Consequently, the cell input having the burst traffic can be delivered uniformly.

Figure 3:
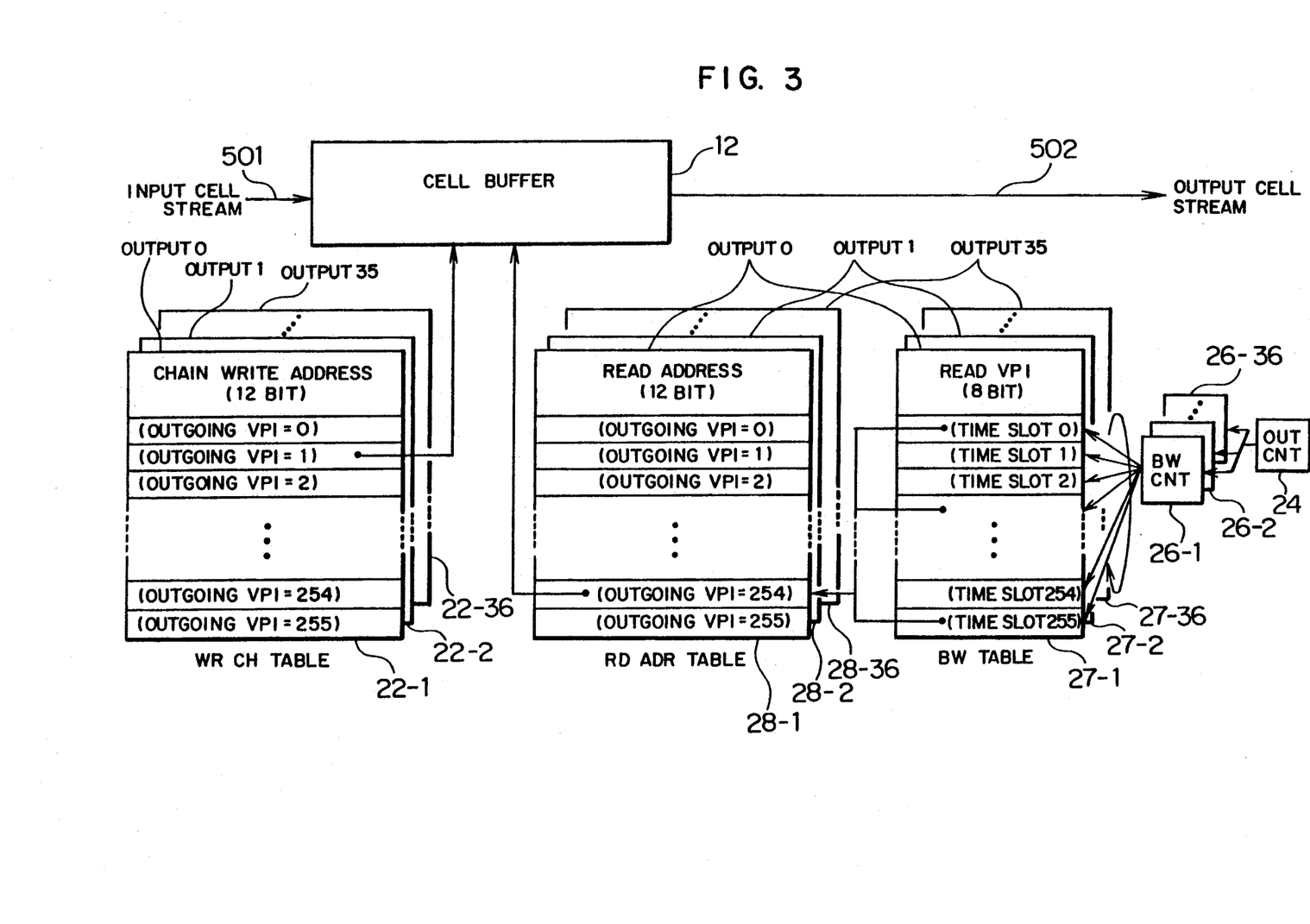
FIG. 3 schematically illustrates an example of an arrangement of control tables in the embodiment of the present invention.

FIG. 3 schematically illustrates the tables in the buffer control block.

When the cell is written, one of the chain write address tables (WR CH Table) 22-1 to 22-36 are selected in accordance with the output line of the cell to be written. A VPI extracted from the input cell is supplied to selected one of the WR CH Tables obtain an address for accessing the cell buffer 12. Further, when the cell is read one of the bandwidth counters (BW CNT) 26-1 to 26-36 one of the bandwidth tables (BW Table) 27-1 to 27-36 and one of the read address tables (RD ADR Table) 28-1 to 28-36 are selected in accordance with the output line (OUT CNT) 24, respectively. Then the selected BW Table 72-1 is referred in accordance with the time slot assigned by the selected BW CNT 26-1 to obtain the VPI. Further, the selected RD ADR Tables 28-i is referred in accordance with that output VPI to obtain a read address designating the memory location of the cell to be read out from the cell buffer 12.

In the embodiment, an example in which one of the bandwidth tables 27-1 to 27-36 is provided for each output has been described, while two of the bandwidth tables can be provided for each output. In this case, when the contents of two bandwidth tables 27-i and 27-i' are different, the bandwidth can be changed instantaneously by switching the table to be used. Further, the writing of the bandwidth table can be made in the unused table so that influence to the bandwidth by the writing can be reduced. It is needless to say that this change can be made for each output and can be made at a time. In addition, a plurality of bandwidth assignments can be changed instantaneously by provision of two or more bandwidth tables.

Further, the VPI given to the table can be part of the VPI bits provided in the cell instead of the whole thereof, in this case, a plurality of cells having different unused VPI bits is connected to the same list structure. That is, different VPI's can be grouped by using partial bits thereof. Thus, the probability that the cell in the designated VPI group exists in the buffer is increased and the opportunity that the cell is delivered is increased so that the capacity of the buffer can be reduced.

In the above-described embodiment, a plurality of the bandwidth counters 26-1 to 26-36 are provided to be one counter for each output line, while this can be performed by a single counter. In this case, the assignment of the time slot for each output line is synchronized.

Further, the bandwidth counters 26-1 to 26-36 having a fixed period such as 256 periods can be used and the counters having a variably set period can be also used. The minimum bandwidth of the settable virtual path can be changed by varying the bandwidth.

With the above configuration, when the cell is not connected to the list structure corresponding to the VPI assigned by the bandwidth tables 27-1 to 27-36, the cell can not be delivered. That is, fluctuation is not allowed with respect to the assignment of the virtual path. In order to allow the fluctuation, when it is determined that there exist input cells in any one of other list structure corresponding to the VPI's assigned in the adjacent time slots (memory locations) of the BW table, one of the se cells may be delivered, so that the fluctuation can be allowed to some degree. Further, in another method applicable instead of the simultaneous investigation as described above, the VPI's referred and confirmed to have input cells in the past several time slots are memorized in order to read out a cell from one of their list structure when no cell was found in a list structure accessed by the VPI corresponding to the present time slot. It is needless to say that when the list structures corresponding to a plurality of VPI's are checked to read out a cell therefrom, the priority of output cell can be in consideration therebetween.

Figure 4:
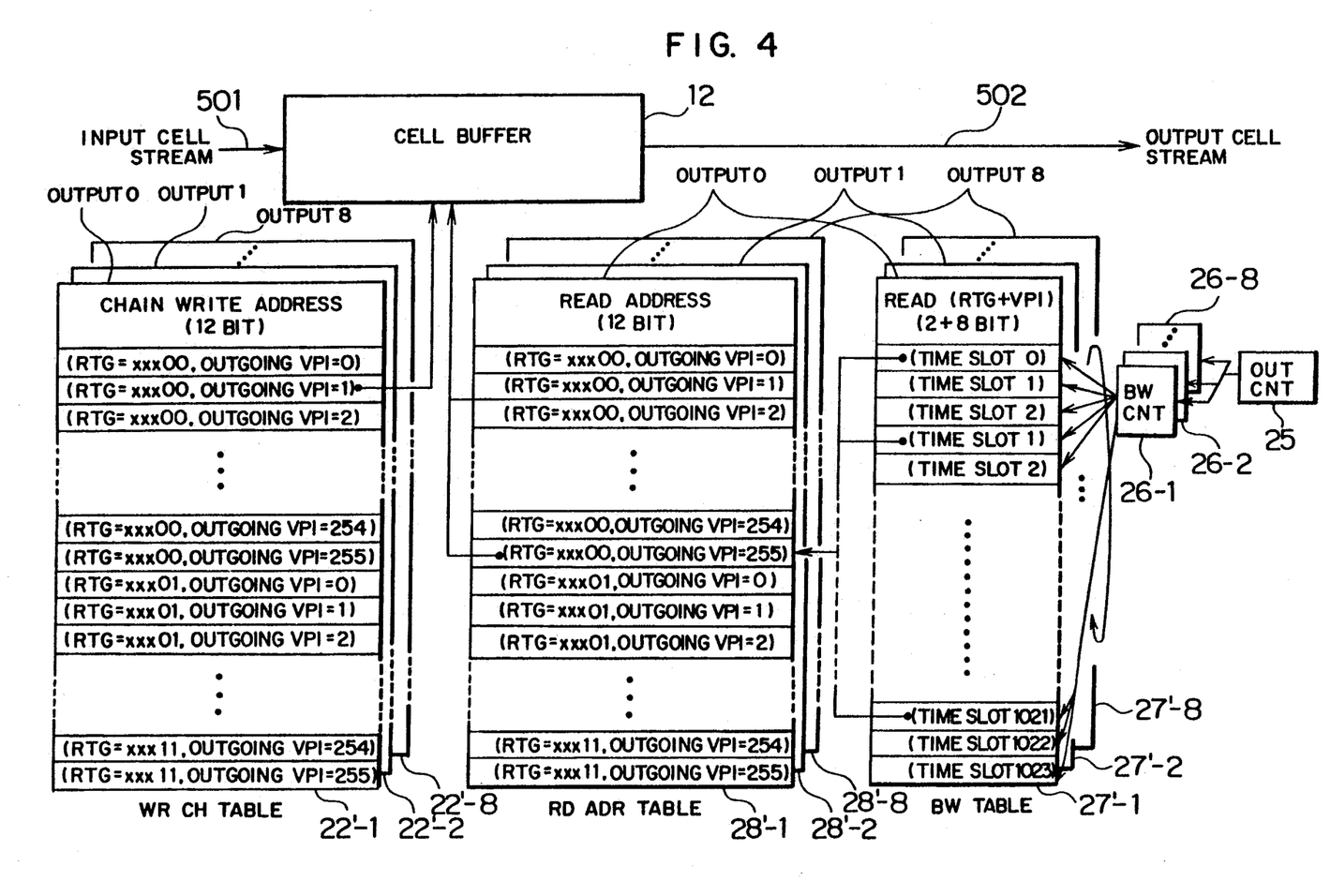
FIG. 4 schematically illustrates an example of an arrangement of control tables in another embodiment of the present invention.

FIG. 4 schematically illustrates an arrangement of tables of the buffer control block according to another embodiment. In the writing operation of the cell, one of the chain write address registers WR CH Table 22'-1 to 22'-36 is selected by the output of the cell to be written. Two lower bits of the output assignment RTG is supplied to the selected WR CH Table 22'-i together with the VPI to obtain the write address for accessing the cell buffer 12. Further, in the reading operation of the cell, one of the bandwidth counters (BW CNT) 26-1 to 26-36, one of the bandwidth tables (BW Table) 27'-1 to 27'-36 and one of the read address tables (RD ADR Table) 28'-1 to 28'-36 are first selected by the output line counter (OUT CNT) 24, respectively. Then, the selected BW to Table 27'-1 are referred in accordance with the time slot assigned by the selected BW CNT 26-i to obtain the VPI to be delivered. At the same time, two lower bits of the assignment RTG for designating the output line is obtained. The RD ADR Table 28'-i is referred in accordance with the VPI and the output assignment bits so that the read address is obtained to access to the cell butter 12.

With such a configuration, the cell output operation can be assigned not only by the VPI defined for every time slot on the BW Table but also by the additional information such as the output line identification information useful in the case of demultiplexing to a low-speed line. In this case, the buffer for demultiplexing to the low-speed line is not required because the low-speed line number is assigned by the RD ADR Table.

The foregoing has described the example in which the two lower bits of the output line assignment information are given, it is needless to say that other information may be given. For example, by giving priority information of the cell as the position of the discardable cell can be periodically assigned. That is, by giving the additional information to refer to the table, it is able to form the list structure classified by the additional information. Accordingly, the assignment of the additional information and re-arrangement are made freely.

It is needless to say that in the above embodiment the VCI which is an identifier of the virtual channel multiplexed in the virtual path may be used, a part of the VCI may be used or a part of the VPI and a part of the VCI may be used simultaneously instead of use of the VPI.

Figure 5:
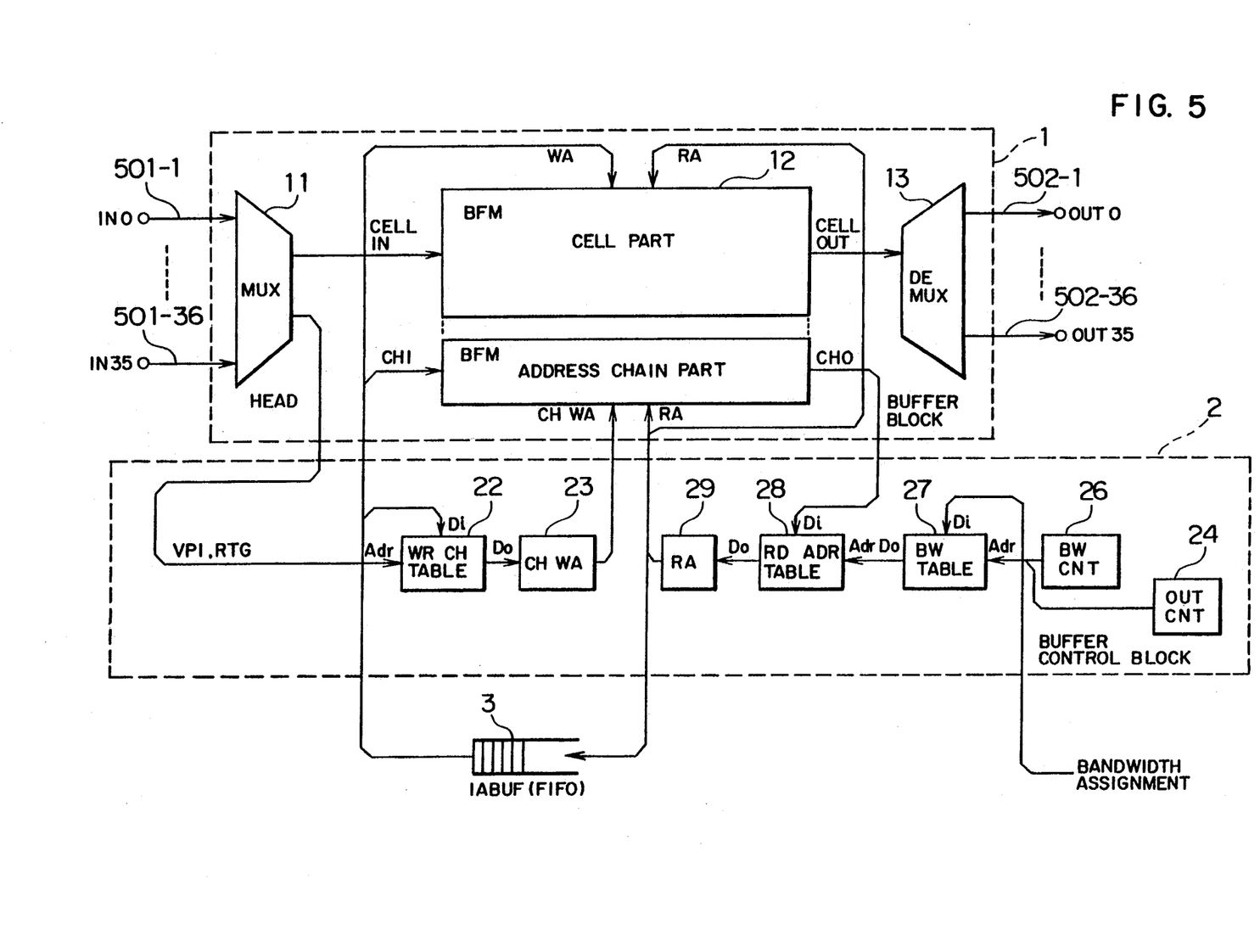
FIG. 5 is a block diagram of another embodiment of a packet switching system of the present invention.

In the above embodiment, a system configuration provided with a plurality sets of the control tables each corresponding to each output line has been described, but it is able to provide only one set of control table for a plurality of output lines and to supply therefrom all output line information as the additional information. That is, the switching operation in the memory switch is identical with the assignment of the phase of the output of the cell, and the configuration using the same table as in the assignment of the output VPI is feasible for the assignment of the phase. With such a configuration, the routing decoder (RT DEC) 21, the output line counter (OUT CNT) 24 and the output line decoder (OUT DEC) 25 are not required. FIG. 5 shows an embodiment in which only one set of control tables is provided.

In this case, the chain write address table (WR CH Table) 22 is supplied with the virtual path identifier (VPI) and routing tag (RTG). Thus, if the output liens of cells are different to each other, that is, their routing tags are different even for the same VPI, these cells are connected to the different list structures. Accordingly, the cell is not delivered to a wrong output. Further, the bandwidth table (BW Table) 27 is supplied with an addition of the output of the bandwidth counter (BW CNT) 26 and the output of the output line counter (OUT CNT) 24. Thus, if the output information represented by the output of the output line counter 24 is different, the VPI to be delivered can be indicated for each output even in the same time slot represented by the bandwidth counter 26 and the cell can be taken out of the different list structure to be delivered. Operation of other portions is the same as that of FIG. 1.

According to the present invention, the shared buffer type memory switch having the list structure for each VPI is employed so that the virtual path or the virtual channel can be assigned to deliver the cell while preserving the order of the cell belonging to the same virtual path or the virtual channel. Accordingly, by assigning so that the same virtual path or the virtual channel are arranged in the output time slots as uniformly as possible, the cell arriving in the burst manner can be arranged and delivered uniformly so that the traffic shaping can be attained.

Further, according to the traffic shaping system used in the shared buffer type memory switch of the present invention, the list structure for each virtual channel or virtual path is prepared in the buffer within the switch. Consequently, no additional buffer is required in the traffic shaping for each output. That is, it is possible to eliminate an increased amount of the buffers.

Further, the present invention having the buffers in a block within the switch can reduce the buffer capacity as a whole by the sharing effect as compared with the case where the traffic shaping is made for each output line. In the present invention, since the switch and the traffic shaping function share the buffers, the amount of buffers of the whole apparatus can be also reduced.

In the present invention, since the assignment and control of the bandwidth are made by the counter and the table for assigning the virtual path or the virtual channel to be delivered, the switch which can made the traffic shaping can be configured only by adding a simple circuit to the buffer control circuit. Further, if the contents of the table can be determined to be optimal previously, the traffic shaping can be made effectively.

Furthermore, in the present invention, since the bandwidth is assigned by using the table, the bandwidth can be changed extremely flexibly. In addition, the bandwidth can be changed instantaneously by the provision of a plurality of bandwidth tables.

In the shared buffer switch of the present invention, additional information is employed in addition to the virtual path or the virtual channel to effect classification so that connection to the list structure can be made. Consequently, the cell output assigning the additional information is feasible. For example, if the number of the line having a low speed is also assigned, the cell can be delivered so that the line number is provided periodically. Thus, the buffers in the demultiplexer can be minimized by distributing the cells to the low-speed line periodically in the demultiplexer to the low-speed line.

We claim:

1. A traffic shaping method for a switching system provided with a shared buffer memory for storing a plurality of fixed length packets, means for supplying fixed length input packets received from a plurality of input lines to said buffer memory, and means for distributing output packets read out from said buffer memory to a plurality of output lines in a predetermined order, each of said input packets including routing information for designating one of said output lines and a connection identifier for designating a virtual connection or a virtual path of the packet, the method comprising the steps of:

storing in said buffer memory each of said input packets making a pair with a pointer address for indicating an address location of a succeeding packet related thereto so as to classify a group of packets to be delivered to a same output line into a plurality of list structures in accordance with the routing information and the connection identifier of the input packets;

assigning connection identifiers to time slots of each of the output lines so that a set of same connection identifiers has a predetermined frequency corresponding to a bandwidth of the communication carried out by the packets having the same connection identifier;

designating one of the output lines periodically;

designating the location address of a packet to be read out from said buffer memory in accordance with one of said assigned connection identifiers which is specified depending on the present time slot on said designated output line;

reading out from said buffer memory a pair of the packet and pointer address belonging to one of said list structures in accordance with said designated location address to supply the packet to said distributing means as said output packet; and storing the pointer address read out from said buffer memory as a new location address for use in the designating step of the location address carried out later.

2. A traffic shaping method according to claim 1, wherein if no packet exists in the list structure corresponding to the assigned connection identifier, another location address corresponding to one of the other of said assigned connection identifiers corresponding to a time slot other than the present time slot is examined and if a packet exists at the other location address in the list structure corresponding to the one connection identifier, the packet is read out to supply to said distributing means.

3. A traffic shaping method according to claim 1, wherein said connection identifier comprises whole or part of the virtual path identifier or the whole or part of the virtual connection identifier or part of a combination of the virtual path identifier and the virtual connection identifier.

4. A traffic shaping method according to claim 1, wherein at least one of the list structures is formed to store a series of input packets classified in accordance with the combination of connection identifier and additional information other than the connection identifier.

5. A traffic shaping method according to claim 4, wherein the additional information includes at least a part of bits indicative of an identification number of the output line.

6. A traffic shaping method according to claim 4, wherein the additional information includes information indicative of a priority of the input packets.

7. A traffic shaping method according to claim 4, wherein the additional information includes at least a part of bits indicative of an identification number of a low-speed output line in the case where the output packets are demultiplexed tot he low-speed line.

8. A packet switching system having a traffic shaping function comprising:

multiplexer means for multiplexing input packets received from a plurality of input lines to a sequential packet stream, each of said input packets having a fixed length and including a routing information for designating one of output lines and a connection identifier for designating a virtual connection and/or a virtual path of the packet;

buffer memory means for temporarily storing the input packets supplied by said multiplexer means, each of said input packets making a pair with a pointer address for indicating a location address of a succeeding input packet related thereto;

idle address buffer means for storing idle addresses to be used as a write address of said buffer memory, write control means for relating the input packets and the pointer addresses in said buffer memory means by using the write address taken out from the idle address buffer means so that a group of input packets to be delivered to a same output line are classified into a plurality of list structures in accordance with the routing information and the connection identifier of the respective input packets;

first counter means for periodically designating said output lines one after another to which an output packet is delivered;

second counter means for designating a current time slot on the designated output line;

bandwidth table means responsive to an output of said second counter means and for producing a connection identifier of an output packet to be delivered to the current time slot on the designated output line; and read control means for producing a read address of a pair of the input packet and the pointer address to be read out from said buffer memory in accordance with the connection identifier produced by the bandwidth table means, the input packet being read out from said buffer memory means according to the read address produced by the read control means and delivered as the output packet to said designated output line, and the pointer address read out together with the packet being stored in said read control means for use in the reading operation of a succeeding packet within the same list structure later.

9. A packet switching system according to claim 8, wherein
said write control means comprises a plurality of write chain address tables corresponding to said output lines each of which stores write addresses of proceeding input packets for use in the forming of said plural list structures and a routing decoder for selecting one of said write chain address tables on the basis of the routing information of an input packet to be stored in the buffer memory, and wherein a a plural sets of said second counter means, said bandwidth table means and said read control means are prepared one set to every output line so that one of said plural sets is selected on the basis of an output of said first counter means.

10. A packet switching system according to claim 8, wherein there are provided two or more bandwidth table means for one connection identifier, and a bandwidth is changed by switching said bandwidth table which is effective at that instant.

11. A packet switching system according to claim 8, wherein a period of said bandwidth counter is different for each output line or can be set for each output line.

12. A packet switching system according to claim 8, wherein said list structures are classified depending on the whole or part of the identifier of the virtual path or whole or part of the identifier of the virtual connection or part of a combination of the identifier of the virtual path and the identifier of the virtual connection.

13. A packet switching system according to claim 8, wherein said list structures are classified so as to be selectable depending on at least a part of said line connection identifier as well as additional information other than said line connection identifier.

14. A packet switching system according to claim 13, wherein said additional information includes a part of said routing information.

15. A packet switching system according to claim 13, wherein said additional information includes information for designating a priority level of said input packet as to discard operation of excess packets effected if congestion is occurred in the packet switching system.

16. A packet switching system according to claim 13, wherein said additional information includes information indicating of a low-speed line of a demultiplexer to be connected with some of said output lines for demultiplexing the output packets of the buffer memory means to the low-speed line or a part of line number of the low-speed line.

* * * * *